US008266666B2

(12) United States Patent
Friedman

(10) Patent No.: US 8,266,666 B2
(45) Date of Patent: Sep. 11, 2012

(54) SYSTEM FOR CONTROLLING MEDIA PRESENTATIONS

(75) Inventor: Lee G. Friedman, Alpharetta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 459 days.

(21) Appl. No.: 12/209,750

(22) Filed: Sep. 12, 2008

(65) Prior Publication Data

US 2010/0071021 A1    Mar. 18, 2010

(51) Int. Cl.
*H04N 7/173* (2011.01)

(52) U.S. Cl. .................................. 725/133; 348/734

(58) Field of Classification Search ................ 725/86; 348/14.05, 734, 114, 211.99
See application file for complete search history.

(56) References Cited

U.S. PATENT DOCUMENTS

| 7,344,084 | B2* | 3/2008 | DaCosta ................. 235/472.01 |
| 2003/0002638 | A1 | 1/2003 | Kaar |
| 2005/0120381 | A1 | 6/2005 | Yamaguchi |
| 2006/0041916 | A1* | 2/2006 | McQuaide, Jr. ................ 725/81 |
| 2006/0085824 | A1* | 4/2006 | Bruck et al. ..................... 725/86 |
| 2006/0270452 | A1 | 11/2006 | Gerzberg |
| 2007/0124792 | A1 | 5/2007 | Bennett et al. |
| 2007/0214484 | A1* | 9/2007 | Taylor et al. .................. 725/100 |
| 2008/0127255 | A1* | 5/2008 | Ress et al. ....................... 725/38 |
| 2008/0148331 | A1 | 6/2008 | Walter et al. |
| 2008/0163330 | A1* | 7/2008 | Sparrell ........................ 725/142 |
| 2008/0301727 | A1* | 12/2008 | Cristofalo et al. .............. 725/35 |
| 2009/0228911 | A1* | 9/2009 | Vrijsen ........................... 725/14 |
| 2009/0248810 | A1* | 10/2009 | Zhu et al. ....................... 709/206 |

FOREIGN PATENT DOCUMENTS

| JP | 2005328394 | 11/2005 |
| NZ | 500203 | 2/2002 |
| WO | 0044168 | 7/2000 |
| WO | 0167316 | 9/2001 |

OTHER PUBLICATIONS

Sullivan et al., "Apparatus and Method for Communicating Media Between Communication Devices", 23 pages; U.S. Appl. No. 11/781,694, filed Jul. 23, 2007.
Scott White, "System for Presenting Media Programs", U.S. Appl. No. 11/738,367, filed Apr. 20, 2007, 23 pages.

(Continued)

*Primary Examiner* — Vivek Srivastava
*Assistant Examiner* — Aklil Tesfaye
(74) *Attorney, Agent, or Firm* — Guntin Meles & Gust, PLC; Douglas Schnabel

(57) ABSTRACT

A system that incorporates teachings of the present disclosure may include, for example, a remote controller that manages operations of a set-top box (STB) having a radio frequency (RF) transceiver, a user interface (UI) with one or more components, and a controller operably coupled to the RF transceiver and the UI. The controller can be adapted to cause the RF transceiver to establish a communication session with a subsystem of an interactive media communication system, cause the RF transceiver to transmit to the subsystem a request for media content, cause the UI to present media content supplied by the subsystem without interrupting operations of the STB, and cause the RF transceiver to transmit to the subsystem one or more commands directed to the STB. Other embodiments are disclosed.

22 Claims, 10 Drawing Sheets

OTHER PUBLICATIONS

TVCompass Inc., "Wireless Interactive Entertainment", 1 page. http://www.tvcompass.com/remote_control/click_wireless.html; website last visited Sep. 12, 2008.

LAST100.COM, "Archos Unveils DVR, WiFi-enabled Set-Top Box", 5 pages. http://www.last100.com/2008/01/04/archos-unveils-dvr-wifi-enabled-set-top-box/; website last visited Sep. 12, 2008.

TVOVER.NET, "Wireless HP IPTV Set-Top Box Unveiled", 6 pages. http://www.tvover.net/2007/03/20/Wireless+HD+IPTV+SetTop+Box+Unveiled.aspx; website last visited Sep. 12, 2008.

Click 365, "ESPN the Ultimate Remote", 1 page; http://www.espnremote.com/; website last visited Sep. 12, 2008.

\* cited by examiner

400

500

600

900

SYSTEM FOR CONTROLLING MEDIA PRESENTATIONS

FIELD OF THE DISCLOSURE

The present disclosure relates generally to media presentation techniques and more specifically to a system for controlling media presentations.

BACKGROUND

A wireless remote controller for a set-top box (STB) can utilize radio frequency (RF) or infrared (IR) access technology to manage operations of the STB. IR remote controllers require line-of-sight connectivity to an STB. Some STBs that support an RF interface can be controlled instead by an RF remote controller with in some cases an operating range of up to 100 feet without the line-of-sight limitation of the IR remote controller.

Typically, when a remote controller is in use, the STB will update what is being presented on a TV screen, which in turn can change the viewing format of a program. For instance, if a user selects a guide button on the remote controller, some STBs will superimpose an electronic programming guide (EPG) on the program.

A manufacturer of remote controllers, such as tvCompass, Inc., has produced a remote controller that supports Wireless Fidelity (WiFi) technology for interconnecting over the Internet to an EPG system distributing programming information supplied by a company such as TV Guide™. TV Guide™ is a service provider of programming information that operates cooperatively but independently from a media service provider that supplies media services to STBs. A WiFi remote controller such as this can provide a user a means to browse through EPG data and other sources of information without altering TV programming while it is being presented by the STB.

DETAILED DESCRIPTION

One embodiment of the present disclosure entails a remote controller that manages operations of a set-top box (STB) having a radio frequency (RF) transceiver, a user interface (UI) with one or more components, and a controller operably coupled to the RF transceiver and the UI. The controller can be adapted to cause the RF transceiver to establish a communication session with a subsystem of an interactive media communication system, cause the RF transceiver to transmit to the subsystem a request for media content, cause the UI to present media content supplied by the subsystem without interrupting operations of the STB, and cause the RF transceiver to transmit to the subsystem one or more commands directed to the STB. The subsystem in response can supply the one or more commands to the STB. The STB and the remote controller can operate from the interactive media communication system.

Another embodiment of the present disclosure entails an STB having a controller to receive from a subsystem of an interactive media communication system one or more commands generated by a remote controller that manages operations of the STB. The remote controller can be adapted to establish a communication session with the subsystem of the interactive media communication system, transmit to the subsystem a request for media content, present media content supplied by the subsystem without interrupting operations of the STB, and transmit to the subsystem the one or more commands directed to the STB.

Yet another embodiment of the present disclosure entails a subsystem of an interactive media communication system having a controller to receive from a remote controller by way of the interactive media communication system one or more commands directed to an STB, and submit to the STB the one or more commands generated by the remote controller. The remote controller is adapted to perform as described in the preceding embodiment.

Another embodiment of the present disclosure entails establishing a communication session with a subsystem of an interactive media communication system, transmitting to the subsystem a request for media content, presenting media content supplied by the subsystem without interrupting operations of an STB, and transmitting to the subsystem one or more commands directed to the STB, wherein the subsystem supplies the one or more commands to the STB, and wherein the STB and the remote controller operate from the interactive media communication system.

Figure 1:
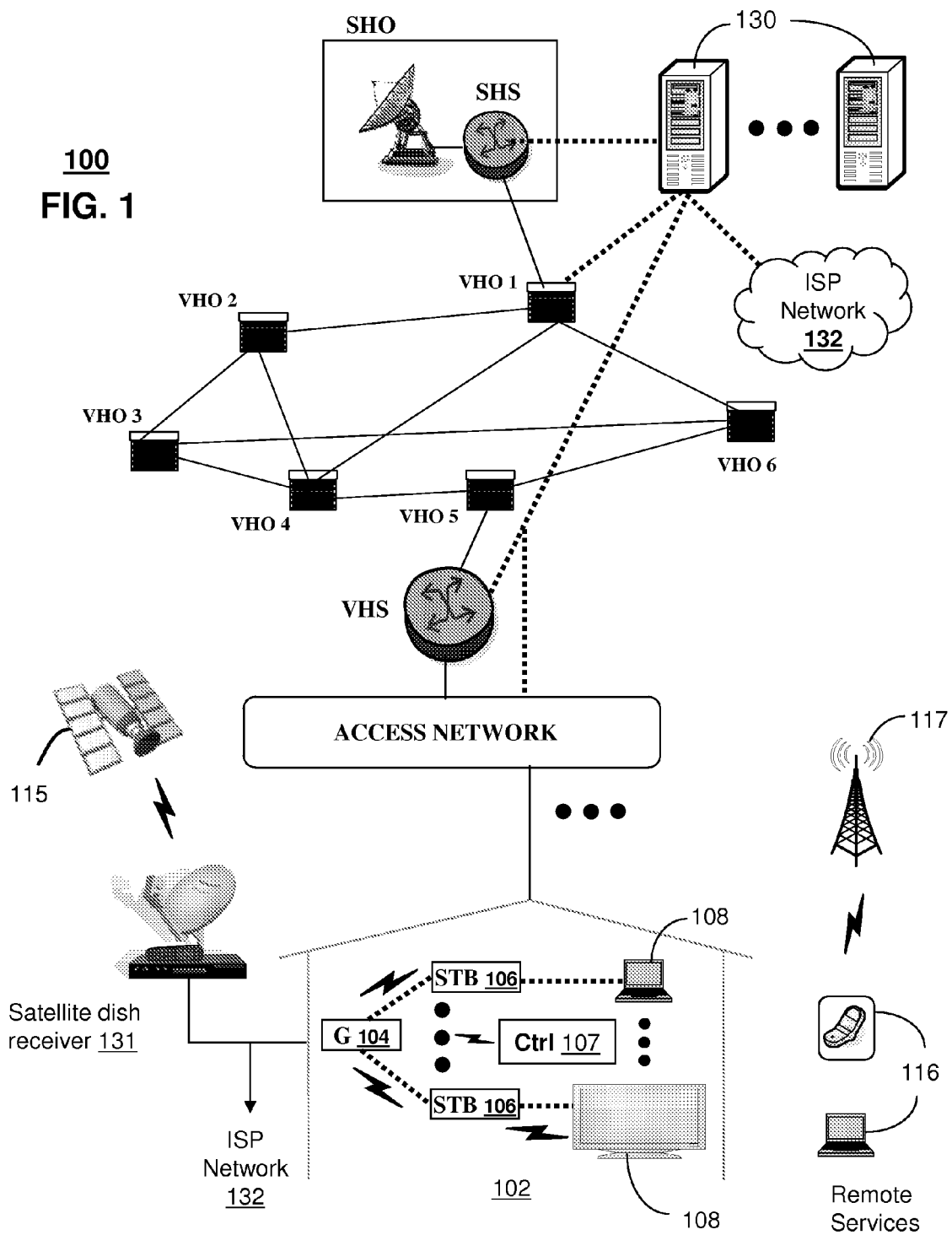
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (e.g., a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media presentation devices 108 such as computers or television sets managed by a media controller 107 interconnected to the STB 106 over one or more network elements of the communication system 100. Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

Another distinct portion of the one or more computing devices 130 can be used as a remote controller (RC) subsystem 130 for processing and/or exchanging commands between subscriber STBs such as reference 106 and a remote controller such as reference 107, each operating from communication system 100. The remote controller 107 in this embodiment can utilize RF communications technology for interconnecting to the RC subsystem 130 by way of the ISP network 132, base station 117, or other network elements of the communication system 100. The remote controller 107 in this illustrative embodiment can represent a WiFi-capable remote controller that can connect to the RC subsystem 130 by way of gateway 104, or an Internet-capable mobile phone or laptop computer such as reference 116. A general description of these devices is provided in FIG. 6 which will be discussed below.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
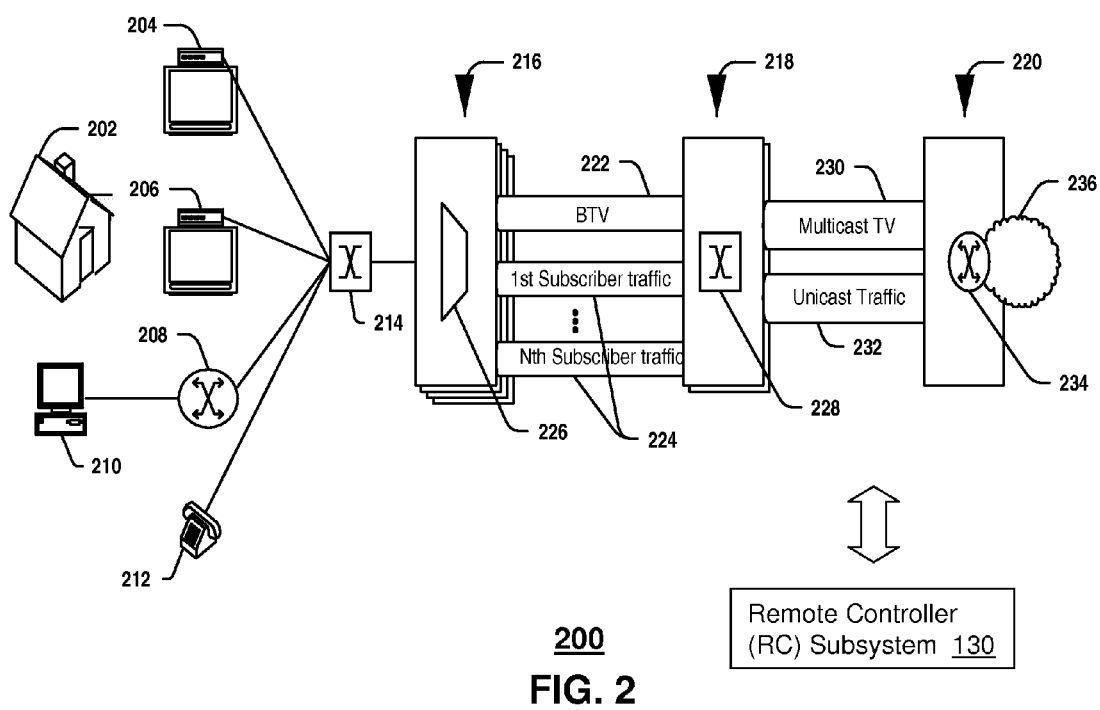

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The RC subsystem 130 of FIG. 1 can be operably coupled to the second communication system 200 for purposes similar to those described above.

Figure 3:
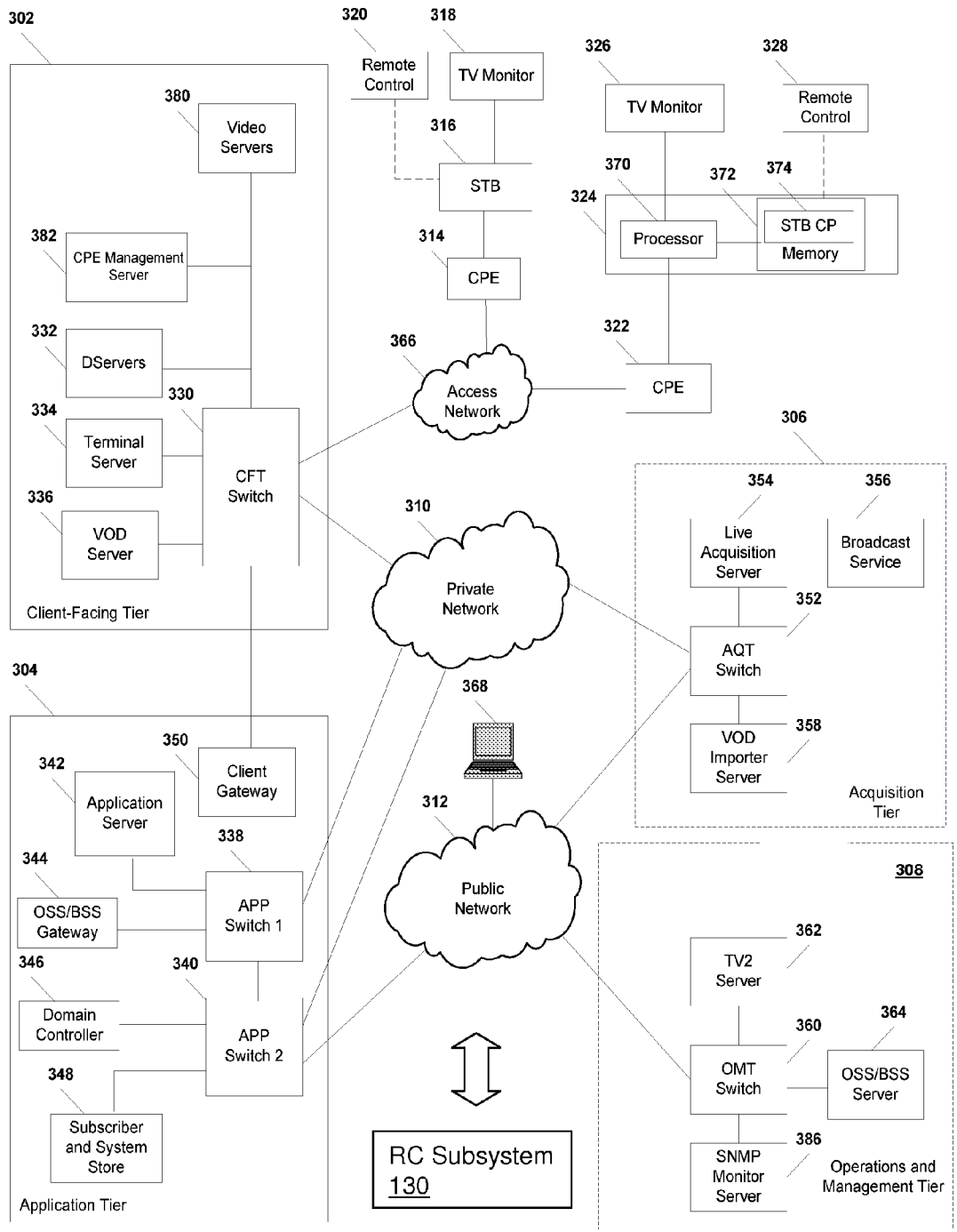

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The RC subsystem 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
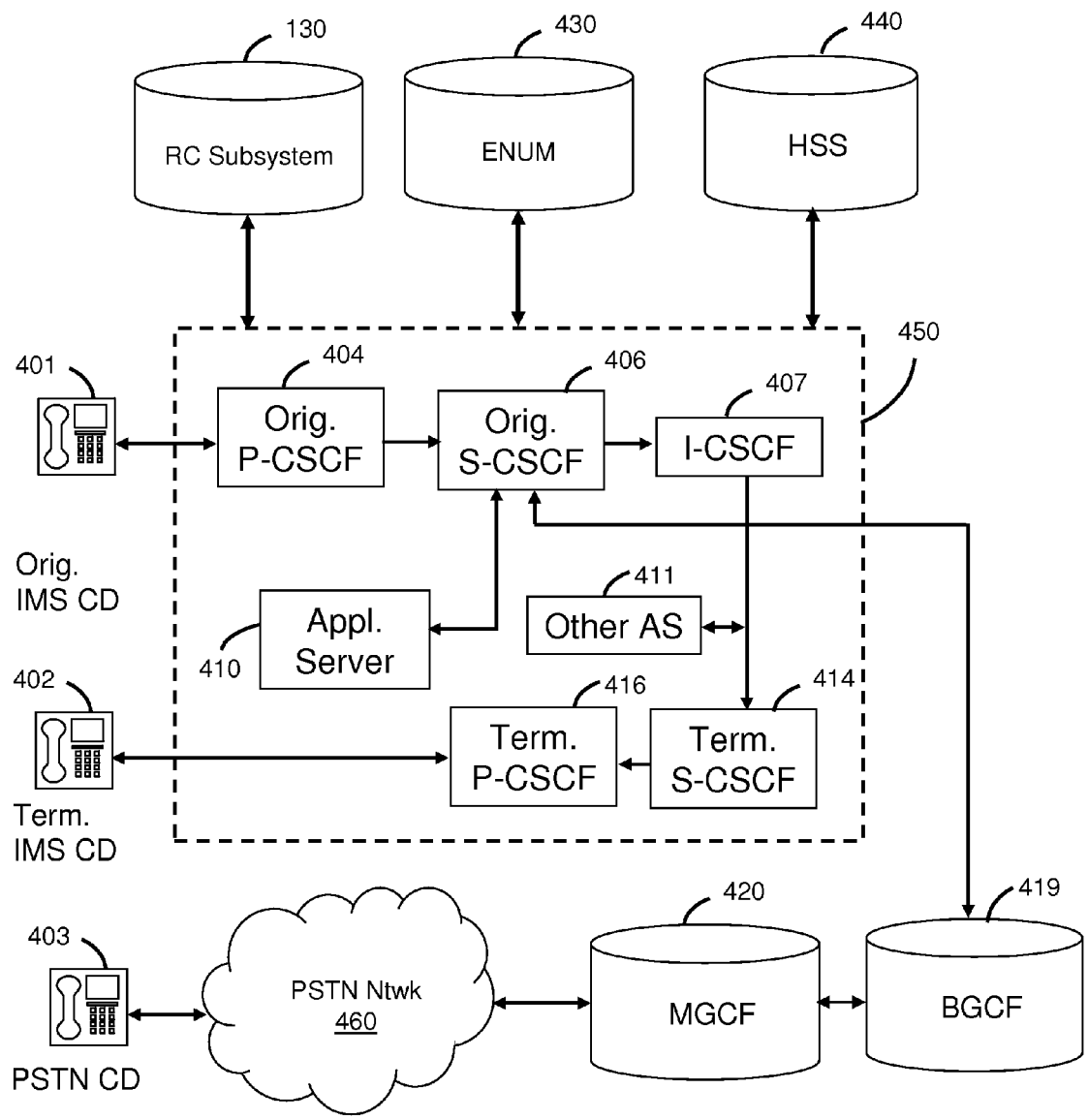

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the RC subsystem 130 previously discussed for FIG. 1. In this representative embodiment, the RC subsystem 130 can be accessed over a PSTN or VoIP channel of communication system 400 by common techniques such as described above.

Figure 5:
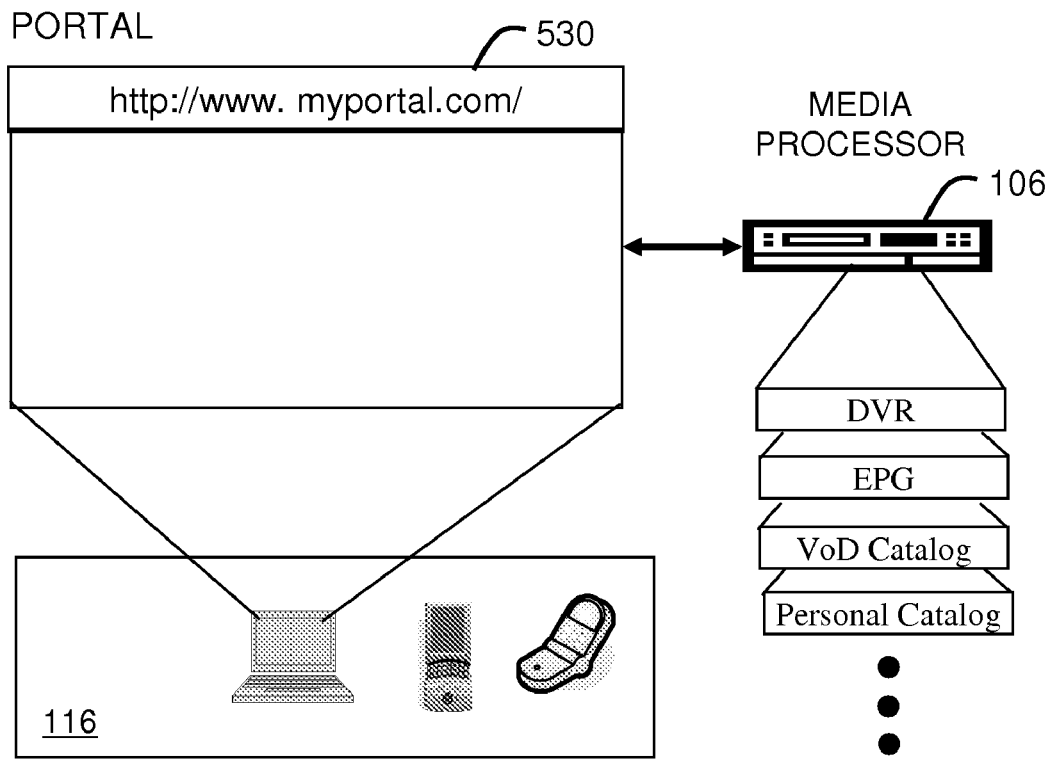
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
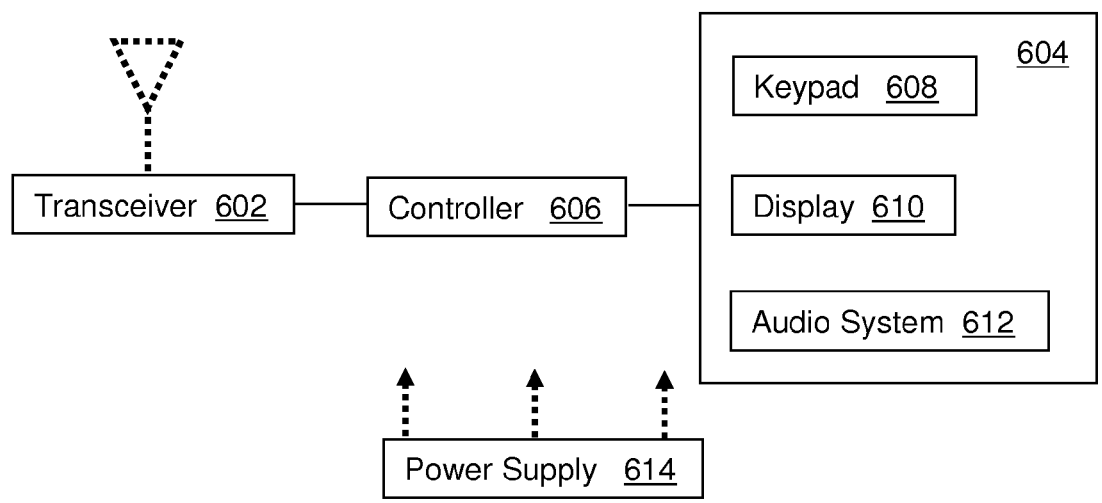
FIG. 6 depicts an illustrative embodiment of a communication device utilized in the communication systems of FIGS. 1-4.

FIG. 6 depicts an exemplary embodiment of a communication device 600. Communication device 600 can represent in whole or in part any of the aforementioned communication devices of FIGS. 1-4 including without limitation an STB, a remote controller, a cellular phone, a laptop computer, a cordless phone, and so on. The communication device 604 can comprise a wireline and/or wireless transceiver 602 (herein transceiver 602), a user interface (UI) 604, a power supply 614, and a controller 606 for managing operations thereof. The transceiver 602 can support short-range or long-range wireless access technologies such as a Bluetooth wireless access protocol, a Zigbee wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EVDO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support the IMS protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (e.g., USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (e.g., audio heard only in the proximity of a human ear) and high volume audio (e.g., speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The controller 606 can utilize computing technologies such as a microprocessor and/or digital signal processor (DSP) with associated storage memory such a Flash, ROM, RAM, SRAM, DRAM or other storage technologies.

Figure 7:
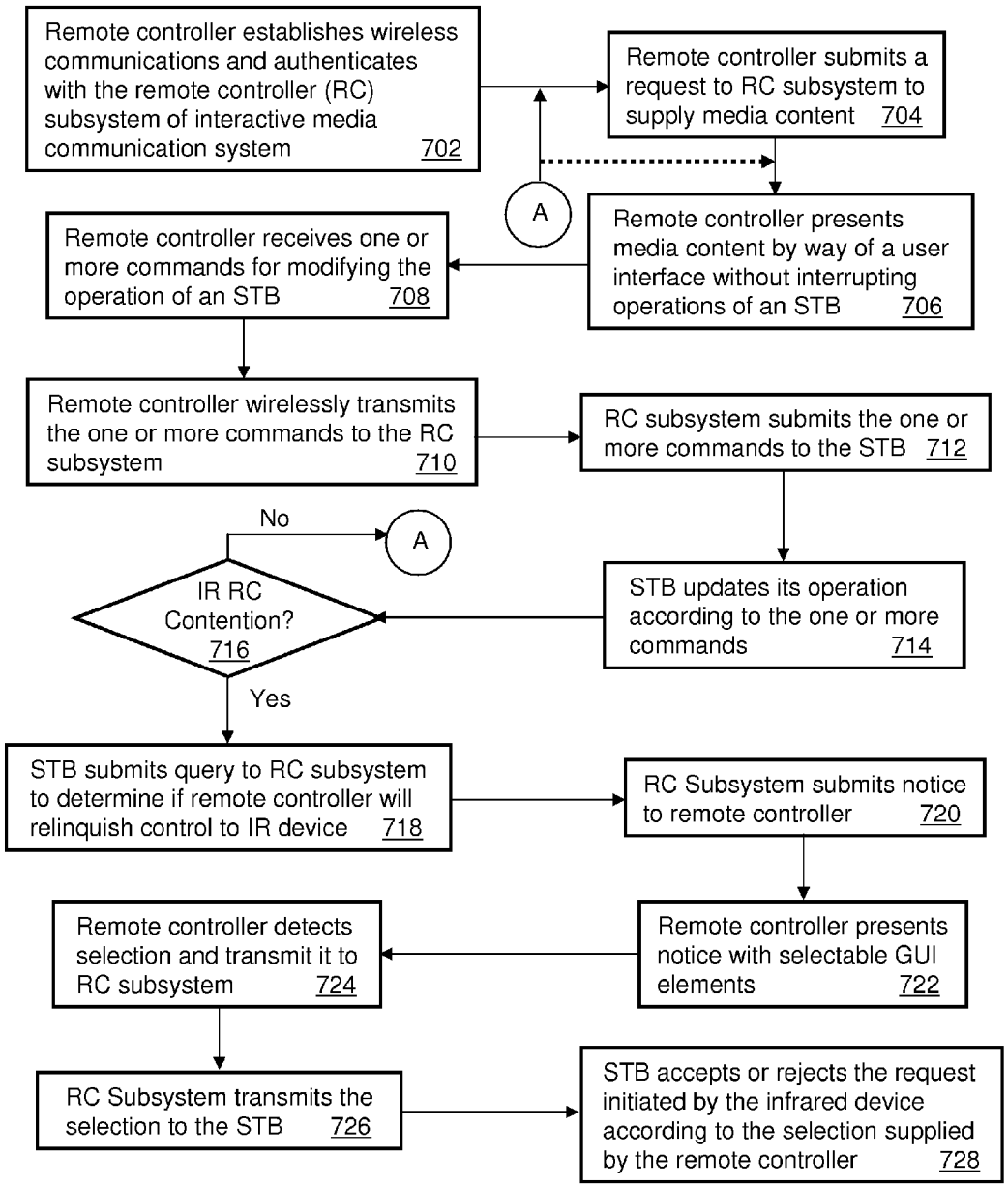
FIG. 7 depicts an illustrative embodiment of a method operating in portions of the communication systems of FIGS. 1-4.
Figure 8:
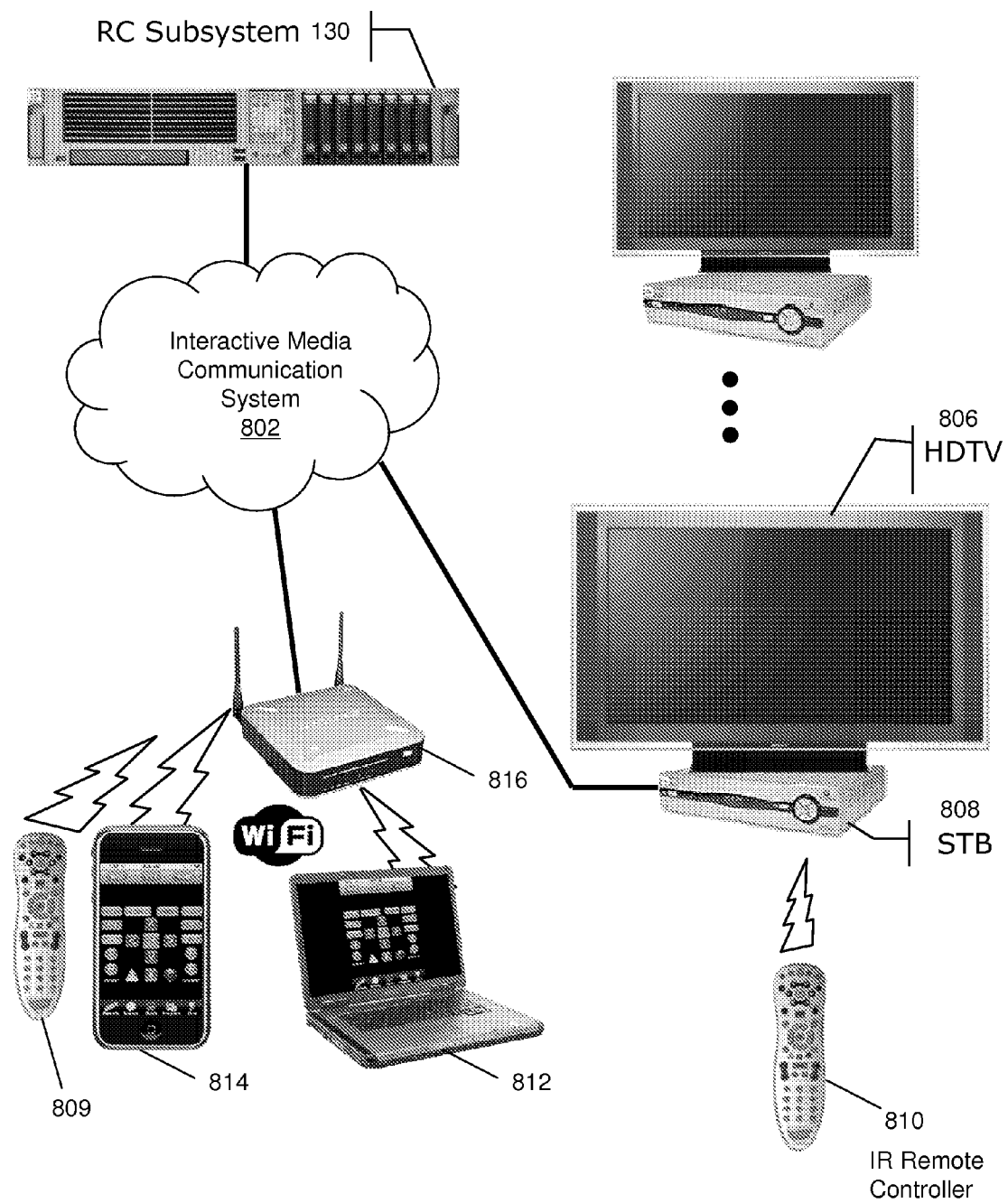
FIGS. 8-9 depict illustrative embodiments of the method of FIG. 7.

FIG. 7 depicts an illustrative method 700 operating in portions of communication systems 100-400. FIG. 8 depicts an illustrative block diagram for applying method 700. In this illustration more than one remote controller can be used. In one illustrative embodiment, the remote controller can represent an Internet-capable device such as a WiFi-enabled remote controller 809, a mobile phone 814 or laptop computer 812 each communicatively coupled to a WiFi router/modem 816. The WiFi router/modem 816 can be a representative embodiment of gateway 104 of FIG. 1 which can provide access to an interactive media communication system 802 (such as the media communication systems of FIGS. 1-4) and its network elements such as the RC subsystem 130. In the case of the mobile phone 814, said device can also be operably coupled to the interactive media communication system 802 by way of the cellular base station such as reference 117 of FIG. 1 over a data channel such as GPRS, EVDO, UMTS, and so on.

The RC subsystem 130 can be coupled to the interactive media communication system 802 to provide devices 809, 812, 814 the ability to manage operations of STB 808 while roaming a residence or commercial establishment, and in the case of the mobile phone 814 while also roaming a cellular network. The STB 808 can also be communicatively coupled to the interactive media communication system 802 by way of a common Internet-capable interface (e.g., Ethernet port of an xDSL or cable modem, etc.) and/or a direct coaxial or optical connection of said system. Accordingly, the STB 808 and the RC subsystem 130 can establish a communication session to provide remote control services to devices 809, 812, 814.

The STB 808 can present media content on a media presentation device such as a common HDTV 806 over a coaxial cable or HDMI interface. It should be noted that the STB 808 can also interface with a common infrared (or line of sight) controller such as reference 810 to manage operations of the STB.

Method 700 presents an illustrative operation of block diagram 800 beginning with step 702 in which a remote controller such as reference 814 establishes wireless communications with the RC subsystem 130 for the purpose of managing operations of STB 808. Once communications have been established, the RC subsystem 130 can request authentication information from the remote controller 814 such a login, password, personal identification number or PIN, and an identification of the STB 808 to be controlled. The identification of the STB 808 can be a static IP address, MAC address, serial number, SIP URI, URL, or other form of identification. Once authenticated, the RC subsystem 130 can operate as an intermediate device for managing operations of the STB 808 by way of the commands presented by the remote controller 814. It should be noted that step 702 assumes the STB 808 is not already under the control of the IR remote controller 810. Contention between remote devices 810 and 814 will be addressed later.

Once the remote controller 814 establishes communications with the RC subsystem 130, the remote controller can submit in step 704 a request for media content. The request can correspond to for example a selection of a specialized key of the UI (e.g., keypad 608) of the remote controller 814. Specialized keys can represent for example an "on demand" key for requesting a video and/or audio on demand catalog, a guide key for requesting an electronic programming guide (EPG), a DVR key for requesting a DVR schedule and/or programming menu, a help key to assist a user in the operations of the remote controller and/or STB, a "my favorites" key for viewing one or more favorite channels in the UI (e.g., display 610) of the remote controller 814, and so on.

The request can also comprise combinations of keys. For instance, the remote controller 814 can have a specialized key for requesting a viewing of a single media program without interrupting what the STB 808 on the HDTV 806. Selecting this key with a channel number can represent a request for a single channel viewing. The remote controller 814 can also make available a multi-channel viewing button. When this button is depressed, the UI of the remote controller 814 can request that a user enter the number of channels to be viewed, and the selected channel numbers.

It follows from these illustrations that a request submitted by the remote controller 814 can represent one or more combination of commands to request media content by way of the RC subsystem 130.

Responsive to the request, the RC subsystem 130 can retrieve the requested media content from one or more network elements of communication systems 100-300 (e.g., VHO, VoD database, EPG database, etc.). To accommodate small displays such the display of the remote controller 814 shown in FIG. 8, the RC subsystem 130 can utilize common transcoding technologies to adapt the resolution and encoding bit rate of the requested media content to match the presentation resources of the remote controller. Other common media presentation parameters (e.g., color v. monochrome) can also be transcoded by the RC subsystem 130. In step 706, the remote controller 814 can present the media content by way of its UI (e.g., display 610 and/or audio system 612) without interrupting operations of the STB since the RC subsystem 130 has yet to submit command and control signals to the STB 808.

Depending on the actions taken by a user of the remote controller 814 while viewing and/or listening to media content, the remote controller can generate in step 708 one or more commands to update operations of the STB 808. For example, the user of the remote controller 814 may decide to view the EPG on the HDTV 806, change the channel being presented at the HDTV, and so on. To accomplish this, the remote controller 814 can provide another specialized key (e.g., "Control STB") to notify the RC subsystem 130 and/or the STB 808 that the remote controller intends to control operations of the STB rather than independent browse media content. This specialized key can operate as a toggle button, e.g., control of the STB 808 in one instance, and browsing media content only at the remote controller 814 in another instance.

Upon depressing the specialized key to initiate control of operations of the STB 808, any subsequent actions of the remote controller 814 can be viewed on the HDTV 806 as the STB 808 adapts its operation according to the actions taken at the remote controller, and if desired the results can also be viewed concurrently at the UI of the remote controller. This operation can be accomplished by the remote controller 814 wirelessly transmitting to the RC subsystem 130 in step 710 the one or more commands directed to the STB 808. In step 712, the RC subsystem 130 can relay to the STB 808 the UDP/TCP commands generated by the remote controller 814, or instead, the RC subsystem can process the UDP/TCP commands and translate them to IR codes or ASCII codes which the STB 808 can readily interpret.

Steps 716-728 can be used to resolve situations when more than one control device attempts to manage operations of the STB 808. In step 716, for instance, the STB 808 can be programmed to detect a request from IR device 810 while the STB is under the control of remote controller 814. If contention is not detected, the remote controller 814 and the RC subsystem 130 continue to manage operations of the STB 808 as described in steps 704-714. If contention is detected, the STB 808 can proceed to step 718 where it submits a query to the RC subsystem 130 to determine if the user of the remote controller 814 wishes to relinquish control to the IR device 810. The RC subsystem 130 in response submits a notice to the remote controller 814 in step 720 associated with the query. The remote controller 814 in step 722 presents the notice in its UI with one or more selectable GUI elements for accepting or rejecting relinquishing control of the STB 808 to the IR device 810.

Figure 9:
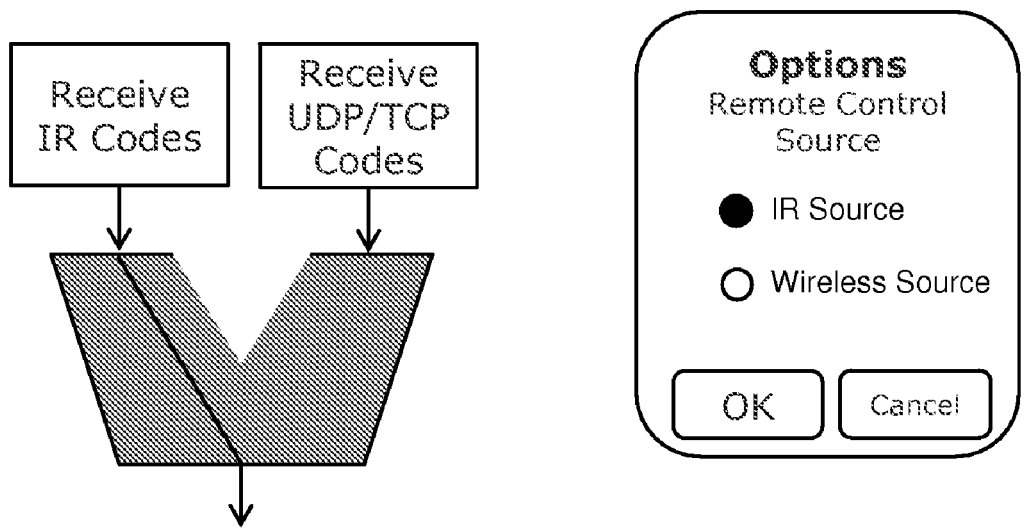
Figure 9:
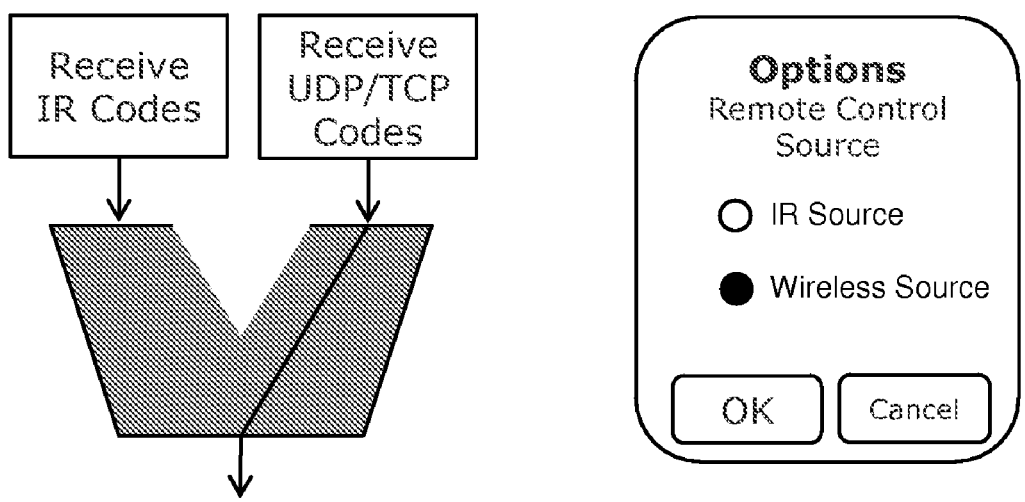

FIG. 9 depicts illustrative embodiments of the GUI elements and the resulting control paths. In this illustration, the UI of the remote controller 814 can present two selectable radio buttons to designate which device is to be in control of the STB 808. Once a selection is made, the OK button can be selected to inform the RC subsystem 130 and subsequently the STB 808 of the selection. The selection process can be performed by the navigation and selection capabilities of the UI of the remote controller 814 (e.g., keypad 608 with navigation disk and selection button). Once a selection is detected in step 724, the remote controller 814 can transmit the selection to the RC subsystem 130, which in turn transmits the selection to the STB 808 in step 726. The STB 808 can in step 728 accept or reject the request initiated by the IR device 810 according to the response of the remote controller 814.

Method 700 as described above provides a means to bifurcate the remote control functions of the STB 808 with a mobile device such as a cellular phone, a WiFi remote controller or a WiFi-capable laptop computer. Method 700 thus provides a user a means to control any function of the STB as well as external devices coupled thereto without a line-of-sight limitation.

Upon reviewing the aforementioned embodiments, it would be evident to an artisan with ordinary skill in the art that said embodiments can be modified, reduced, or enhanced without departing from the scope and spirit of the claims described below. For example, method 700 can be adapted so that when an IR device 810 is in control of the STB 808, the remote controller 814 can submit an arbitration request to the STB. In this embodiment, the GUI windows presented at the UI of the remote controller 814 illustrated in FIG. 9 can instead be presented at the HDTV 806. The user of the IR device 810 can navigate in illustrative GUIs of FIG. 9 and either relinquish control to the remote controller 814 or reject the request. Either selection can be conveyed to the remote controller 814 by way of the RC subsystem 130. In yet another embodiment, the functions of the RC subsystem 130 can be integrated into a device local to residence or local establishment 102 shown in FIG. 1. For example, the RC subsystem 130 can be an integral part of the gateway 104 which can operate as a modem and/or WiFi router.

In yet another embodiment, method 700 can be adapted so that the user of the remote controller can transition between STBs in different locations of a home. Once the user has been authenticated, method 700 can also be adapted to forego a request for authentication data when transitioning between STBs since it was provided on the first instance of controlling a select STB. Moreover, method 700 can be adapted so that the remote controller can detect the presence of another STB, and prompt the user as to whether a switch to the detected STB is desirable.

It should be noted further that the remote controller can correspond to any Internet-capable communication device as described by FIG. 6. Accordingly, the remote controller can represent for example a portable WiFi remote controller with a display, which can be used between rooms in a customer's premises without line of sight to the STB. The remote controller can also represent for example a WiFi-enabled laptop computer, a cellular phone with WiFi or an Internet-capable data channel, a WiFi cordless phone, and so on.

It is further noted that the present disclosure provides a means for a user of the remote controller to separate command and control from a viewing experience. Accordingly, long-range portable remote controllers such as a cellular phone can be used to control functions of an STB while the user is in transit (e.g., traveling on a train), on business travel in another state or country, located in another room of the user's residence, or located in some other location outside the residence. In this illustrative embodiment, the remote command and control functions (such as DVR control, parental controls, etc.) can be used to direct operations of a select STB at distances far from the reach of a selected STB.

In this embodiment, the remote controller can also be prompted by a request submitted by the subsystem 130 to enable a presentation of a media program that is blocked by parental control settings. The prompt can originate from a user of a select STB requesting access to the media program, which causes the STB to transmit this request to the subsystem 130 to be relayed to the parent carrying the remote controller outside the reach of the requesting party. In this instance, the remote user (parent) can accept or reject the request using the portable remote controller. Responses detected by the remote controller can then be transmitted thereby to the subsystem 130 which can then direct the initiating STB accordingly.

This bifurcation of command and control also provides a user of the remote controller a means to avoid a disruption or alteration of a media program being viewed at a media presentation device such as a TV controlled by the STB by one or more other users.

Other suitable modifications can be applied to the present disclosure without departing from the scope of the claims below. Accordingly, the reader is directed to the claims section for a fuller understanding of the breadth and scope of the present disclosure.

Figure 10:
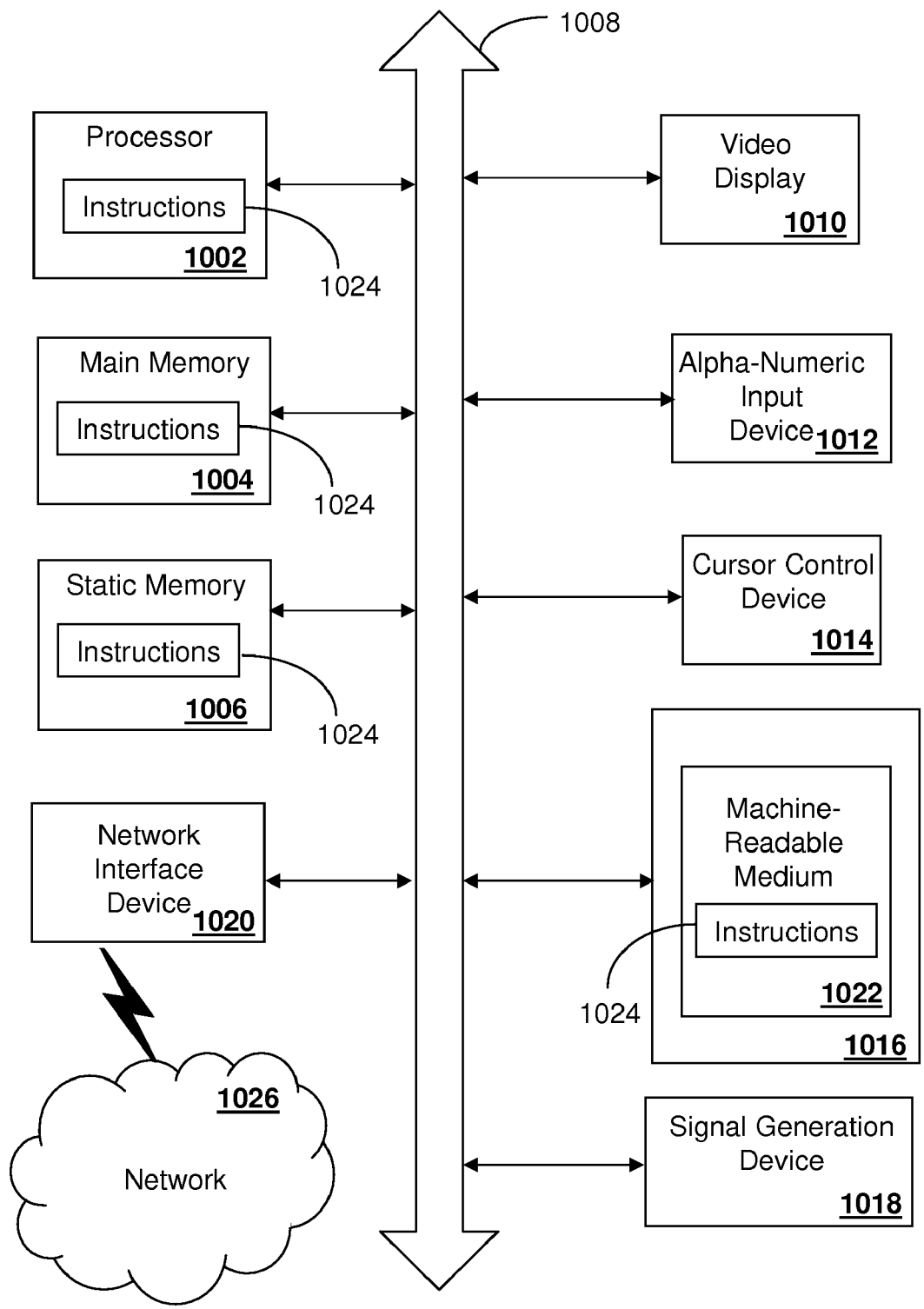
FIG. 10 is a diagrammatic representation of a machine in the form of a computer system within which a set of instructions, when executed, may cause the machine to perform any one or more of the methodologies discussed herein.

FIG. 10 depicts an exemplary diagrammatic representation of a machine in the form of a computer system 1000 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a machine-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A remote controller comprising:
    a radio frequency transceiver;
    a user interface with at least one component; a memory storing computer instructions; and
    a controller operably coupled to the memory, radio frequency transceiver and the user interface, wherein the controller, responsive to executing the computer instructions, performs operations comprising:
        causing the radio frequency transceiver to communicate utilizing a communication session with a subsystem of an interactive media communication system to control a set-top box by way of commands transmitted from the radio frequency transceiver to the subsystem for controlling the set-top box via the subsystem, wherein the communication session operates according to an Internet Protocol: and wherein the subsystem and the set-top box operate from the interactive media communications system;
    presenting at the user interface of the remote controller one or more selectable graphical user interface elements associated with selectively accepting or rejecting relinquishment of control of the set-top box responsive to a notice received at the radio frequency transceiver from the subsystem, wherein the set-top box is controllable by both the remote controller and an infrared device, and wherein the notice indicates a request to transfer control to the infrared device communicatively coupled to the set-top box.

2. The remote controller of claim 1, wherein the remote controller corresponds to one of a device supplied with the set-top box for managing operations thereof, a mobile computer, and a mobile phone, and wherein the one or more commands conforms to one of a user datagram protocol or transmission control protocol.

3. The remote controller of claim 1, wherein the radio frequency transceiver operates according to one of a plurality of wireless access protocols comprising Bluetooth, Wireless Fidelity, Enhanced Data rates for GSM Evolution, GSM General Packet Radio Service, Evolution Data Optimized or Evolution Data Only, Universal Mobile Telecommunications System, WiMAX, Zigbee, or one or more Software Defined Radio protocols.

4. The remote controller of claim 1, wherein the controller, responsive to executing the computer instructions, performs operations comprising presenting at the user interface of the remote controller media content supplied by the subsystem to the remote controller without interrupting operations of the set-top box and wherein the media content supplied to the remote controller comprises at least one of an electronic programming guide, a video on demand catalog, a help menu, information associated with a digital media recorder, metadata associated with one or more media programs, or one or more media streams corresponding to one or more media programs.

5. The remote controller of claim 4, wherein the controller responsive to executing the computer instructions, performs operations comprising detecting a selection of at least one of the one or more selectable graphical user interface elements associated with selectively accepting or rejecting the relinquishment of control of the set-top box by the remote controller; and transmitting the selection to the subsystem.

6. The remote controller of claim 5, wherein the subsystem transmits the selection to the set-top box, and wherein the set-top box accepts or rejects the request to transfer control to the infrared device according to the selection supplied by the remote controller to the subsystem.

7. The remote controller of claim 4, wherein the media content presented at the user interface corresponds to one of audio content, still image content, moving image content or combinations thereof.

8. The remote controller of claim 1, wherein the interactive media communication system corresponds to at least one of an Internet Protocol Multimedia Subsystem communication system, an internet protocol television communication system, a cable television communication system, a satellite television communication system, or combinations thereof.

9. The remote controller of claim 1, wherein the user interface comprises at least one of a display, an audio system, or a set-top box keypad control system.

10. The remote controller of claim 1, where the display is a touch-sensitive display, and wherein the set-top box keypad control system is in whole or in part a touch-sensitive representation portrayed by the display.

11. A set-top box, comprising a memory storing computer instruction: and a controller coupled to the memory, wherein the controller, responsive to executing the computer instructions, performs operations comprising
    receiving commands from a remote controller communicating to the set-top box over an internet protocol connection from a subsystem of an interactive media communication system;
    receiving commands from an infrared device, wherein the set-top box is controllable by either the remote controller or the infrared device;
    receiving from the infrared device a request to enable control of the set-top box by the infrared device and to disable control of the set-top box by the remote controller; sending to the remote controller by way of the subsystem the request; receiving from the remote controller by way of the subsystem a response to the request, wherein one or more selectable graphical user interface elements associated with selectively accepting or rejecting the request are presented at a user interface of the remote controller; and responsive to the received response, enabling control of the set-top box by the infrared device and disable control of the set-top box by the remote controller.

12. The set-top box of claim 11, wherein the remote controller I corresponds to one of a device supplied with the set-top box, a mobile computer, ma4 or a mobile phone.

13. The set-top box of claim 11, wherein the internet connection comprises an interactive media communication session that is at least in part a wireless communication session operating according to one of a plurality of wireless access protocols comprising Bluetooth, Wireless Fidelity, Enhanced Data rates for GSM Evolution, GSM General Packet Radio Service, Evolution Data Optimized or Evolution Data Only, Universal Mobile Telecommunications System, WiMAX, Zigbee, or one or more Software Defined Radio protocols.

14. The set-top box of claim 11, wherein the subsystem provides media content to the remote controller without interrupting operations of the set-top box and wherein the media content supplied to the remote controller comprises at least one of an electronic programming guide, a video on demand catalog, a help menu, information associated with a digital media recorder, metadata associated with one or more media programs, or one or more media streams corresponding to one or more media programs.

15. The set-top box of claim 11, wherein the interactive media communication system corresponds to at least one of an Internet Protocol Multimedia Subsystem communication system, an internet protocol television communication system, a cable television communication system, a satellite television communication system, or combinations thereof.

16. The set-top box of claim 14, wherein the media content presented at the remote controller corresponds to one of audio content, still image content, moving image content or combinations thereof.

17. A subsystem of an interactive media communication system, comprising a memory storing computer instructions; and coupled to a controller, wherein the controller responsive to executing the computer instructions, performs operations comprising
  receiving by way of at least partial wireless communication from a remote controller one or more commands directed to a set-top box
  submitting to the set-top box the one or more commands generated by the remote controller to control the set-top box;
  receiving from the set-top box a request for the set-top box to transfer control from the remote controller to an infrared device that is in communication with the set-top box, wherein the set-top box is controllable by either the remote controller or the infrared device;
  sending by wireless communication to the remote controller a notice of the request for the set-top box to transfer control, wherein one or more selectable graphical user interface elements associated with selectively accepting or rejecting the request are presented at a user interface of the remote controller; and
  receiving from the remote controller a response to the notice of the request, wherein the response is associated with accepting or rejecting the request to transfer control.

18. The subsystem of claim 17, wherein the remote controller corresponds to one of a device supplied with the set-top box, a mobile computer, and a mobile phone, and wherein the wireless communication operates according to one of a plurality of wireless access protocols comprising Bluetooth, Wireless Fidelity, Enhanced Data rates for GSM Evolution, GSM General Packet Radio Service, Evolution Data Optimized or Evolution Data Only, Universal Mobile Telecommunications System, WiMAX, Zigbee, or one or more Software Defined Radio protocols.

19. The subsystem of claim 17, wherein the subsystem provides media content to the remote controller without interrupting operations of the set-top box and wherein the media content presented at the remote controller corresponds to one of audio content, still image content, moving image content or combinations thereof, and wherein the interactive media communication system corresponds to at least one of an Internet Protocol Multimedia Subsystem communication system, an internet protocol television communication system, a cable television communication system, a satellite television communication system, or combinations thereof.

20. The subsystem of claim 17, wherein set-top box transfers control based at least in part on the submitted received response.

21. A method, comprising:
  receiving from a remote controller one or more commands directed to a set-top box, wherein the set-top box and the remote controller operate from an interactive media communication system;
  receiving a request to enable control of the set-top box by an infrared device and to disable control of the set-top box by the remote controller, wherein the set-top box is controllable by either the remote controller or the infrared device;
  sending a notice to the remote controller of the request, wherein one or more selectable graphical user interface elements associated with selectively accepting or rejecting the request are presented at a user interface of the remote controller;
  receiving from the remote controller a response to the notice of the request, wherein the response is associated with accepting or rejecting the request; and
  responsive to the received response, enabling control of the set-top box by the infrared device and disabling control of the set-top box by the remote controller.

22. The method of claim 21, further comprising:
  sending to the remote controller a request to enable a presentation of a media program limited in presentation by an established parental control setting; and
  receiving from the remote controller an acceptance or rejection to the request to enable the presentation.

* * * * *